(12) United States Patent
Vainer (10) Patent No.: US 9,439,398 B2
(45) Date of Patent: Sep. 13, 2016

(54) DOG FECES COLLECTING DEVICE

(71) Applicant: Leonid Vainer, Kiryat Ata (IL)

(72) Inventor: Leonid Vainer, Kiryat Ata (IL)

( * ) Notice: Subject to any disclaimer, the term of this patent is extended or adjusted under 35 U.S.C. 154(b) by 0 days.

(21) Appl. No.: 14/936,708

(22) Filed: Nov. 10, 2015

(65) Prior Publication Data

US 2016/0128304 A1    May 12, 2016

(30) Foreign Application Priority Data

Nov. 11, 2014  (IL) .......................................... 235648

(51) Int. Cl.
*A01K 29/00*  (2006.01)
*E01H 1/12*  (2006.01)
*A01K 23/00*  (2006.01)

(52) U.S. Cl.
CPC ........... *A01K 23/005* (2013.01); *E01H 1/1206* (2013.01)

(58) Field of Classification Search
CPC .............. A01K 23/005; E01H 1/1206; E01H 2001/122; E01H 2001/1226; E01H 2001/1246; E01H 2001/1293
USPC .................................................... 294/1.3, 1.4
See application file for complete search history.

(56) References Cited

U.S. PATENT DOCUMENTS

| | | | | |
|---|---|---|---|---|
| 3,929,363 A | * | 12/1975 | Kahan ..................... | B65D 75/22 294/1.4 |
| 4,014,584 A | * | 3/1977 | Bau ....................... | E01H 1/1206 294/1.4 |
| 5,236,237 A | | 8/1993 | Shultz | |
| 5,355,836 A | | 10/1994 | Vallery | |
| 6,986,325 B1 | * | 1/2006 | Hsu ........................ | E01H 1/1206 119/161 |
| 7,635,153 B2 | * | 12/2009 | Anderson ............. | E01H 1/1206 294/1.3 |
| 7,854,455 B2 | | 12/2010 | Ruscil et al. | |
| 8,177,270 B2 | | 5/2012 | Chen | |
| 8,534,725 B1 | | 9/2013 | Burke | |
| 2004/0119304 A1 | | 6/2004 | Iso et al. | |
| 2007/0194580 A1 | * | 8/2007 | Raasch ................. | E01H 1/1206 294/1.4 |
| 2008/0048463 A1 | | 2/2008 | Selenke et al. | |
| 2010/0072765 A1 | | 3/2010 | Granado | |
| 2013/0327283 A1 | | 12/2013 | Hazan | |

FOREIGN PATENT DOCUMENTS

| | | |
|---|---|---|
| EP | 2727464 | 5/2015 |
| JP | H1175602 | 3/1999 |
| JP | 3908779 | 4/2007 |

* cited by examiner

*Primary Examiner* — Dean Kramer
(74) *Attorney, Agent, or Firm* — Haim M. Factor (57) ABSTRACT

A dog feces collecting device, comprising: four crescent arms, arranged in a line of two pairs in such a way that in the middle of the line is generated a cylindrical space in which a cylindrical feces collecting container can be placed; a longitudinal axle, for pivotally connecting each of the pair of arms from a top side thereof, thereby allowing rotationally drawing away the arms of each of the pairs from each other, and vice versa; linearly drawing away each of the pair of arms from each other, and vice versa; a mechanism for carrying out the rotational movement; a mechanism for carrying out the linear movement; a mechanism in the arms for grasping the container; wherein the cylindrical container has a longitudinal cut or separatable lane. The container may be based on a cardboard kernel tube of a toilet roller.

15 Claims, 12 Drawing Sheets

DOG FECES COLLECTING DEVICE

RELATED APPLICATION

The present application claims priority from Israel Patent Application no. 235648, filed 11 Nov. 2014, whose disclosure is incorporated herein by reference.

TECHNICAL FIELD

The present invention relates to the field of dog feces collecting devices.

BACKGROUND ART

The dog is one of the favorite pets of humans. However, one obstacle is the problem of dog feces collection. In addition to being unaesthetic dog feces attracts flies, it creates an environmental nuisance, and as such the problem is particularly acute in dense urban areas, although it also is a problem in rural areas.

Over the years, many attempts have been made to find a solution, but these solutions are not effective enough. For example, U.S. Pat. No. 5,355,836, U.S. Pat. No. 5,236,237, US20040119304, U.S. Pat. No. 8,177,270, EP2727464, US20130327283, U.S. Pat. No. 7,854,455, U.S. Pat. No. 8,534,725, US20080048463, US20100072765 are some of these attempts.

All the methods described above have not yet provided satisfactory solutions to the problem of collecting dog feces.

It is an object of the present invention to provide a solution to the above-mentioned and other problems of the prior art.

Other objects and advantages of the invention will become apparent as the description proceeds.

SUMMARY OF THE INVENTION

In one aspect, the present invention is directed to a dog feces collecting device (100), comprising:
- four crescent arms (20a, . . . 20d), arranged in a line (queue) of two pairs (20a, 20b and 20, 20d) in such a way that in the middle of the line (queue) is generated a cylindrical space in which a cylindrical feces collecting container (40) can be placed;
- a longitudinal axle (32), for pivotal connecting each of the pair of arms from a top side thereof, thereby allowing
  (a) rotationally drawing away (26) the arms of each of the pairs from each other, and vice versa,
  (b) linearly drawing away (28) each of the pair of arms from each other, and vice versa,
- a mechanism for carrying out the rotational movement (26);
- a mechanism for carrying out the linear movement (28);
- a mechanism (14) in the arms for grasping the container (40);
- wherein the cylindrical container (40) has a longitudinal cut (48) or separatable lane;
- thereby allowing opening and closing the container while grasping thereof by the crescent arms, resulting in the ability to collect and dispose of dog feces by opening and closing the arms in a rotational movement (26), and disposing from the container (40) by the linear movement (28).

According to one embodiment of the invention, the mechanism for carrying out the rotational movement is propelled by moving a lever (10).

According to one embodiment of the invention, the mechanism for carrying out the linear movement (28) is propelled by rotating a knob (12) firmly connected to the lever (10).

According to one embodiment of the invention, the mechanism for carrying out the rotational movement (26) comprises:
- a base (38) having a vertical longitudinal cylindrical channel;
- a lever (10) moveable through the cylindrical channel, the lever (10) being connected to the axle (32);
- a transmission lever (30), pivotally connected in one end thereof to the base (38) and pivotally connected to an other end thereof to the crescent arms at a distant from the longitudinal axle (32);
- thereby moving the lever (10) downwards results in opening each side pair of arms wide in a rotational movement (26), and vice versa.

According to one embodiment of the invention, the mechanism for carrying out the linear movement (26) comprises:
- crankshaft (50) firmly connected to the lever (10), thereby a rotational movement of the level along a longitudinal axis thereof results in rotating the crankshaft (50);
- two cranks (52), each connecting the crankshaft (50) to one of the pair of arms (20a, 20b and 20, 20d);
- thereby pivotally rotating the lever in one direction resulting in drawing each of the pair of arms from each other, and vice versa.

The container may further comprise a cap on each side thereof. The cap may comprise: sidewalls (44), a flap (46); and a cut (45) or separatable lane along the flap (46).

Preferably, the mechanism (14) for grasping the container (40) is folded edges (14) of the crescent edges.

According to one embodiment of the invention, at least one of the arms further comprises a recess (60), for allowing removing the container from the device.

In another aspect, the present invention is directed to a dog feces container, comprising:
- cylindrical walls (42);
- a longitudinal cut (48) or separatable lane along said cylindrical walls (42).

The container may further comprise:
- sidewalls (44) for covering openings of the cylindrical walls (42);
- a flap (46), for connecting the sidewalls (44) to the cylindrical walls (42); and
- a cut (45) or separatable lane along the sidewalls, correspondingly to the longitudinal cut (48).

According to one embodiment of the invention, the cylindrical walls are a cardboard kernel tube of a toilet roller.

Each of the cuts or separatable lanes (45, 48) may be linear, in a zigzag form, and so on.

The material the components of the collecting container (40) may be made of liquid rejecting material, such as wax.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

BRIEF DESCRIPTION OF DRAWINGS

Preferred embodiments, features, aspects and advantages of the present invention are described herein in conjunction with the following drawings.

It should be understood that the drawings are not necessarily drawn to scale.

DESCRIPTION OF EMBODIMENTS

The present invention will be understood from the following detailed description of preferred embodiments ("best mode"), which are meant to be descriptive and not limiting. For the sake of brevity, some well-known features, methods, systems, procedures, components, circuits, and so on, are not described in detail.

Figure 6:
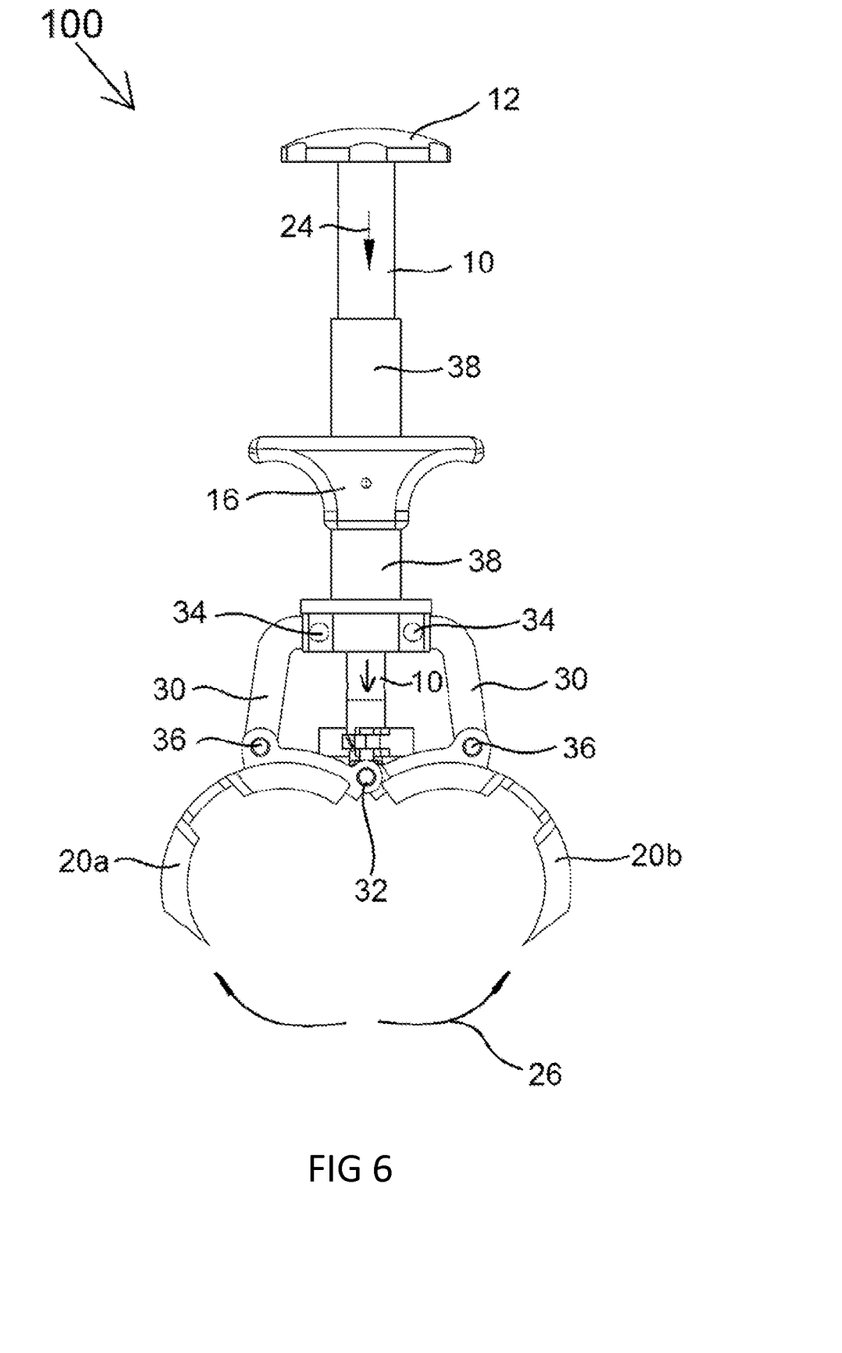
FIG. 6 is a front view of the device in this situation.
Figure 7:
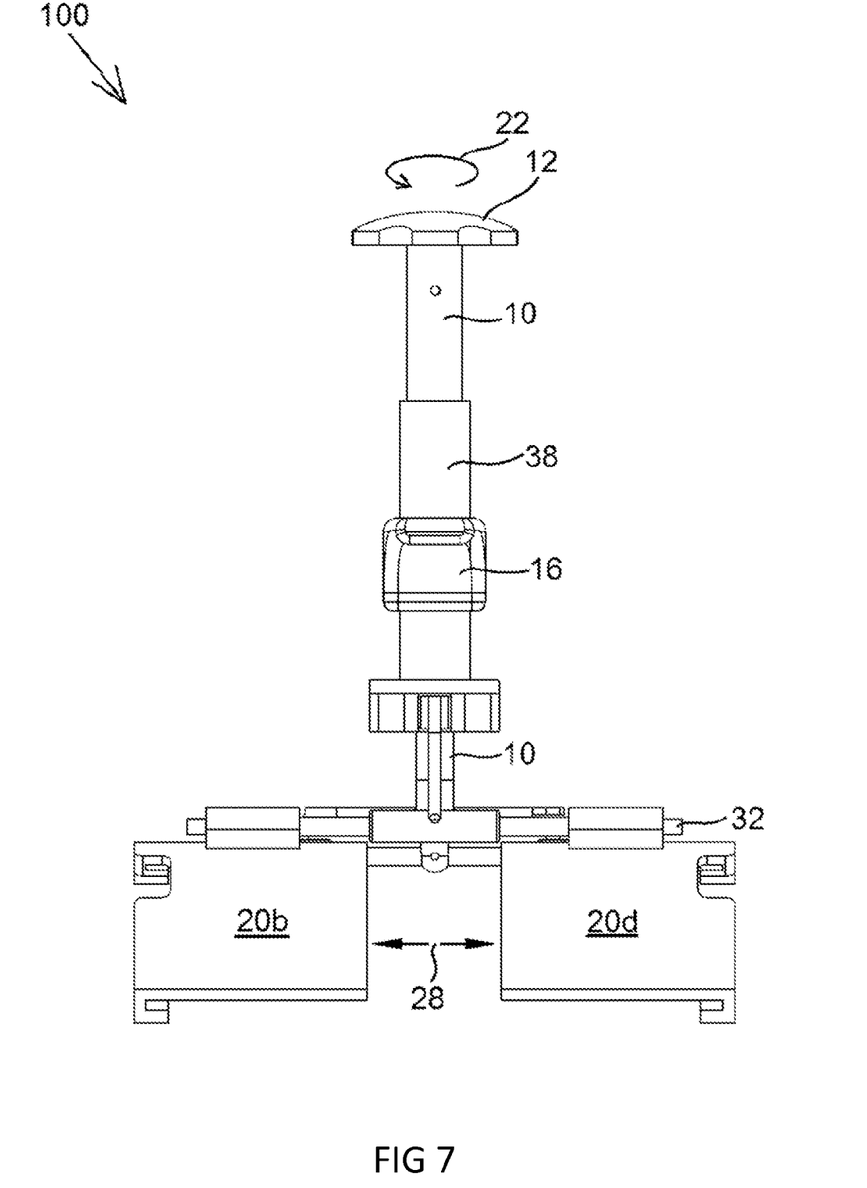
FIG. 7 is a side view of the device in this situation.
Figure 8:
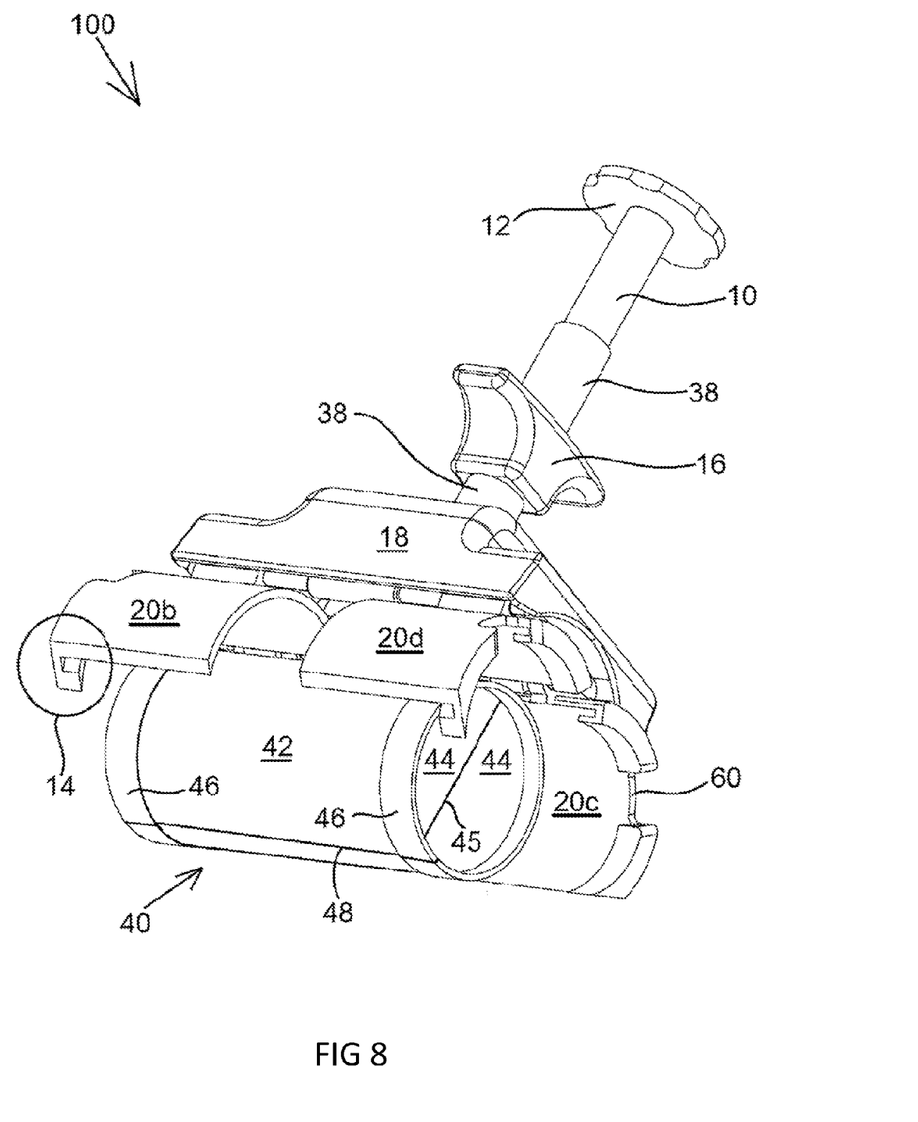
FIG. 8 schematically illustrates the bottom side of the dog feces collecting device 100 of FIG. 1.
Figure 9:
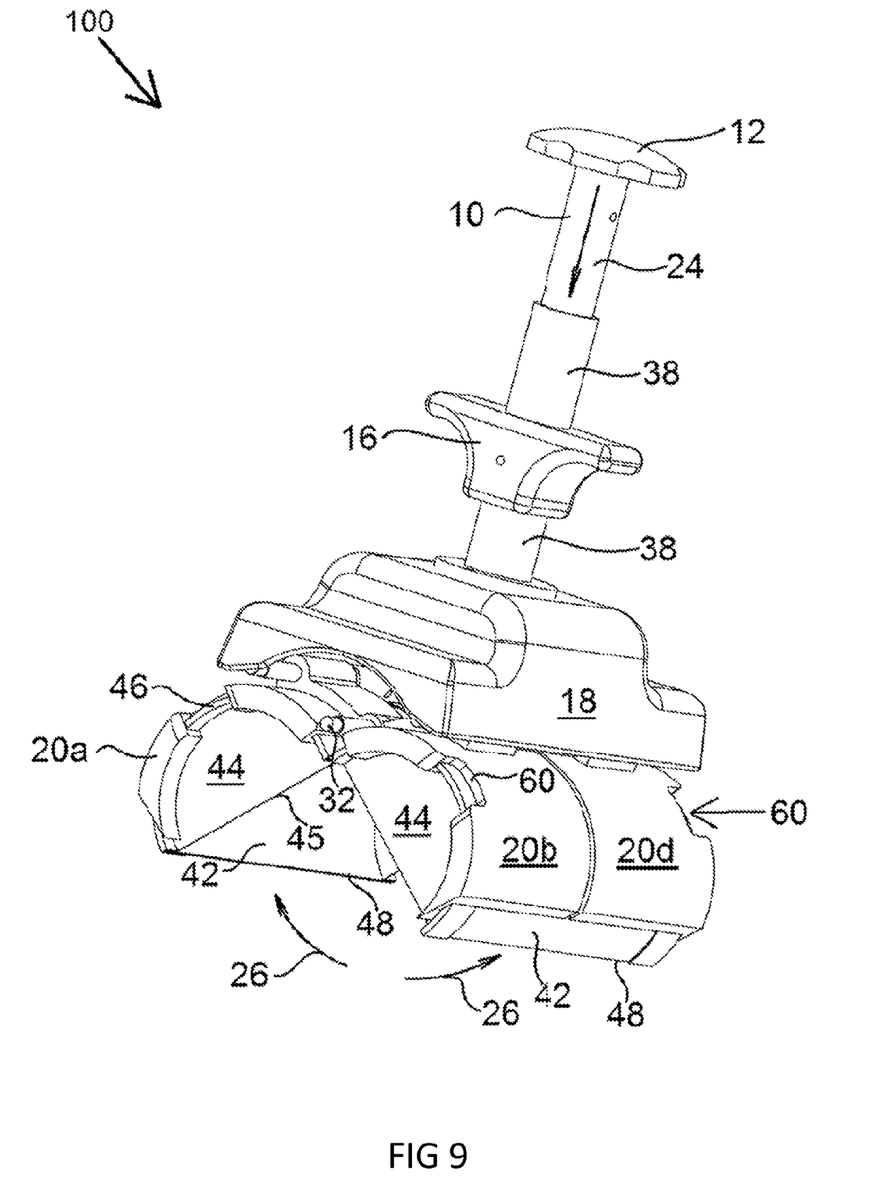
FIG. 9 schematically illustrates the mechanism of rotationally opening the arms of device 100 of FIG. 1, while container 40 is installed therein.

FIGS. 8-9 illustrate how to operate the device for collecting dog feces, while the rest of the figures illustrate the structure of the device.

Figure 1:
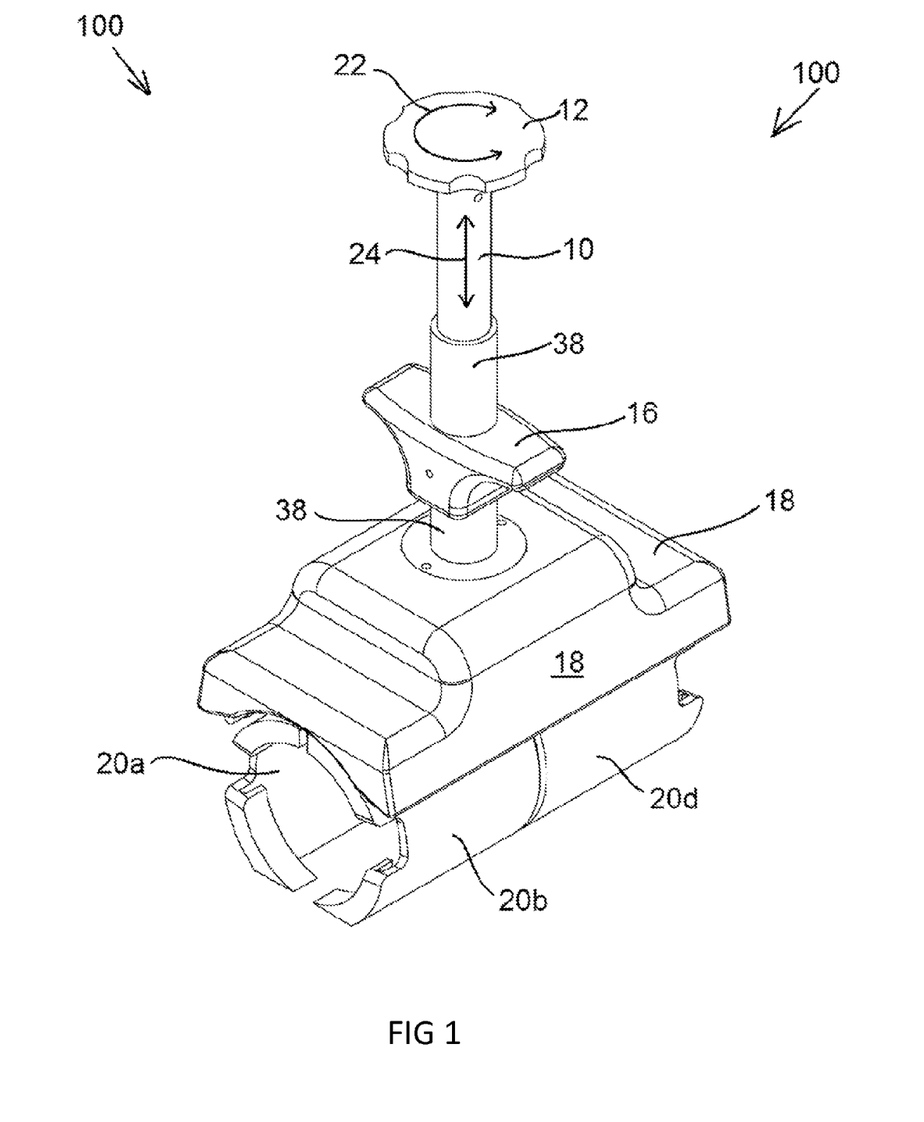
FIG. 1 is a perspective view schematically illustrating a dog feces collecting device, according to one embodiment of the present invention.
Figure 2:
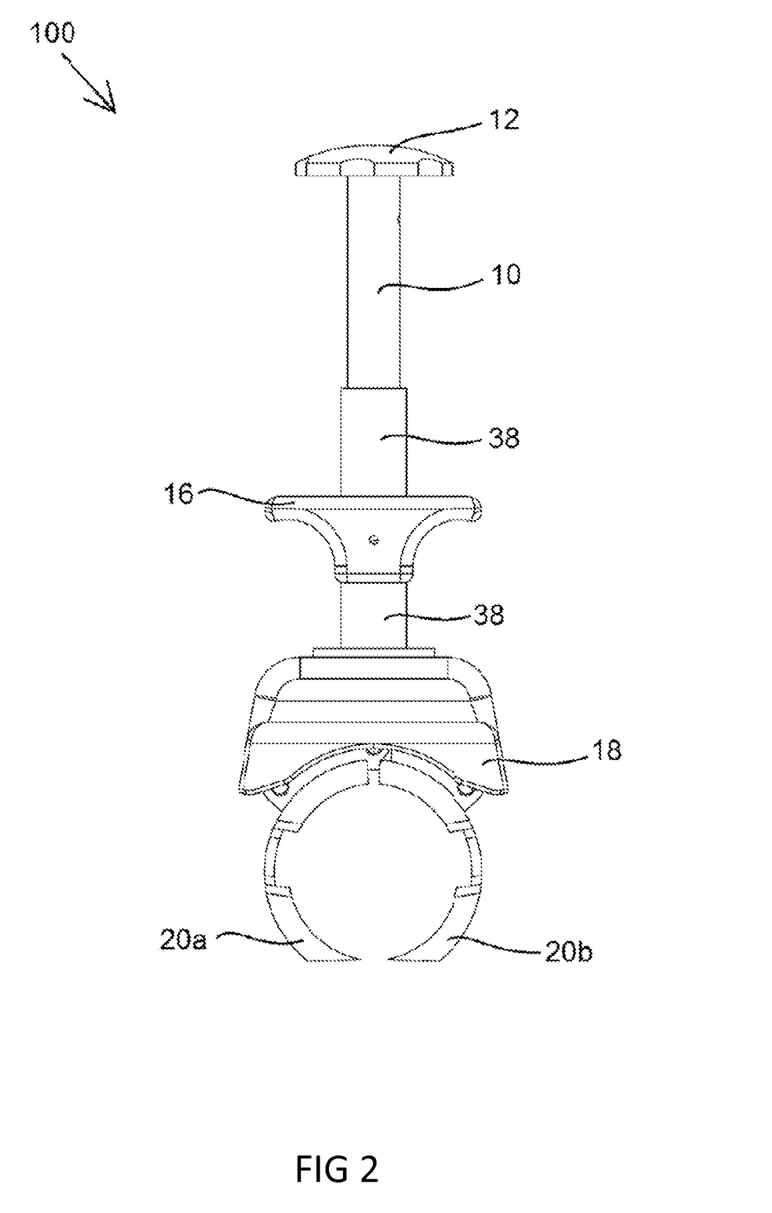
FIG. 2 is a front view of the device of FIG. 1.
Figure 3:
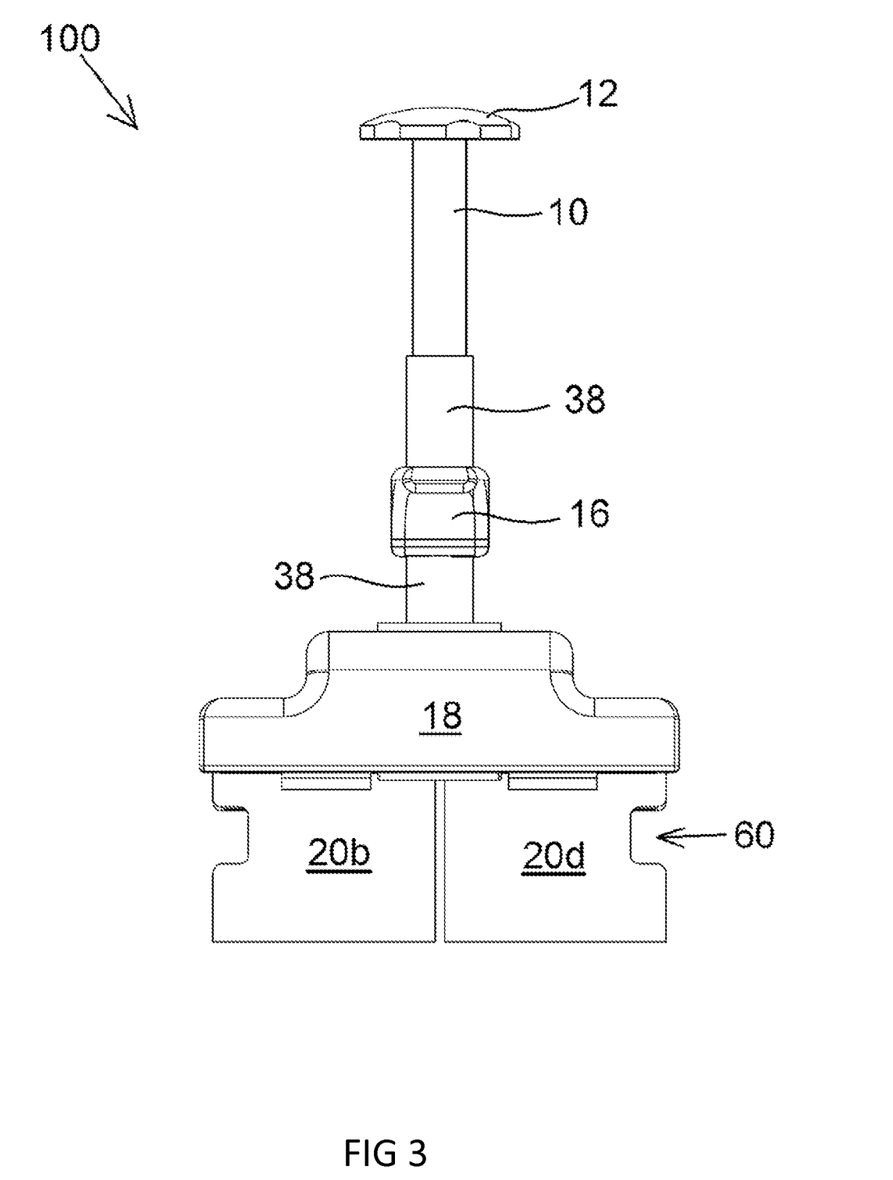
FIG. 3 is a side view of the device of FIG. 1.

FIG. 1 is a perspective view schematically illustrating a dog feces collecting device, according to one embodiment of the present invention. FIG. 2 is a front view of the device of FIG. 1, and FIG. 3 is a side view thereof.

The dog feces collecting device, which is marked herein by reference numeral 100, comprises a base 38, from which a lever 10 protrudes. A knob 12 is firmly connected to the protruding end of lever 10. A handle 16 is connected to base 38, and is used as a holding point against lever 10.

The lever 10 can be moved downwards linearly (24) and rotationally (22). The linear movement 24 is carried out by pushing lever 10 towards handle 16; the rotational movement (22) is carried out by rotating knob 12. An inverse motion can be obtained by a spring or by manual operation, i.e., pulling lever 10 upwards, and rotating knob 12 by a reverse direction.

Device 100 has four crescent arms 20a . . . 20d, each in the form of a scoop. As explained below, pushing lever 10 downwards (relative to base 38) causes the arms to open along axle 32 in a pivotal motion 26 (shown in FIGS. 5 and 6), while turning knob 12 causes the arms to move away from each other in a linear motion 28 (shown in FIGS. 4 and 5) also along axle 32. This point is further detailed below.

Reference numeral 18 is a cover which is used for preventing dust from entering the mechanism of the device, and also as an ornamental element.

Figure 4:
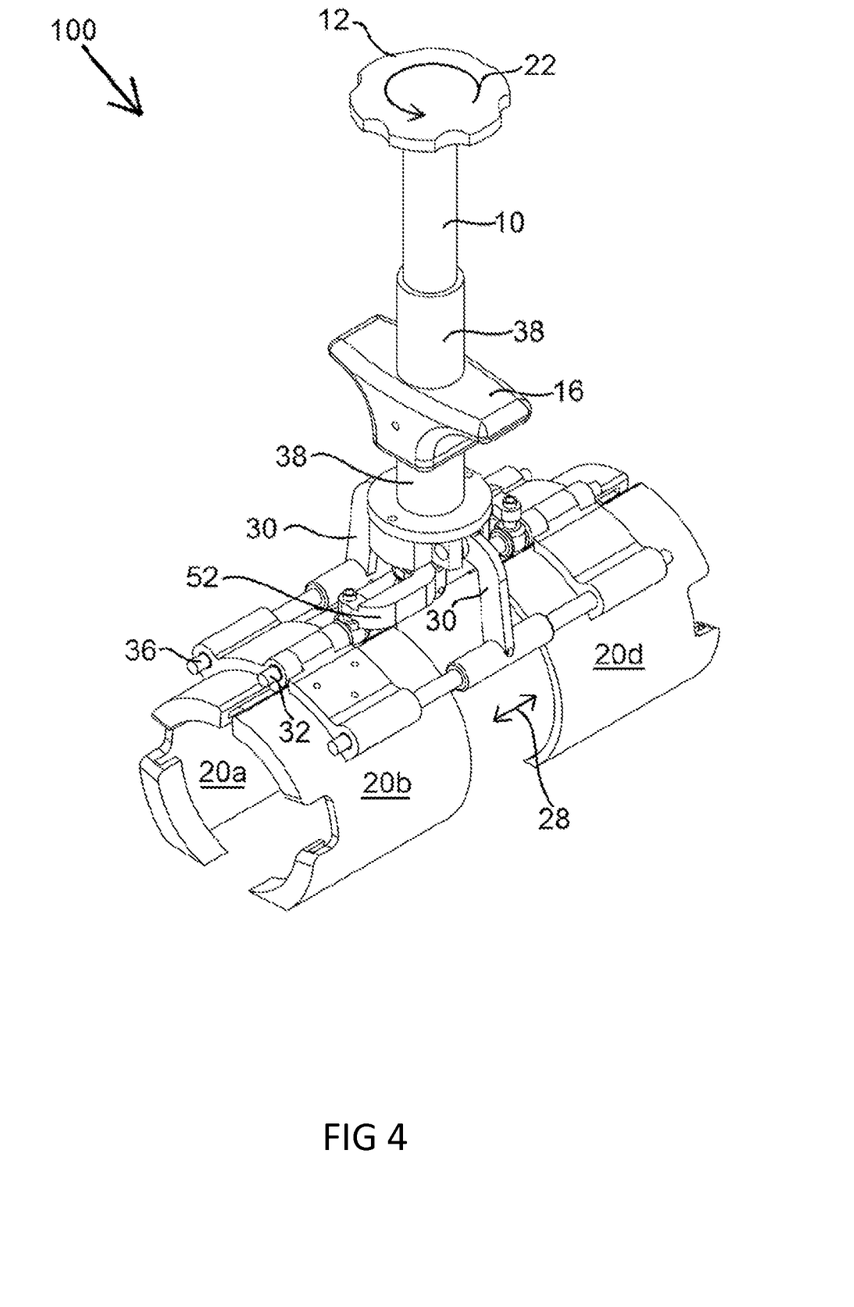
FIG. 4 is a perspective view schematically illustrating the dog feces collecting device 100 of FIG. 1 in a situation wherein cover 18 (which is shown in FIG. 1) is removed.

FIG. 4 is a perspective view schematically illustrating the dog feces collecting device 100 of FIG. 1 in a situation wherein cover 18 (which is shown in FIG. 1) is removed.

In this figure, arms 20a and 20b are distant from arms 20c and 20d, due to a linear motion 28, caused as a result of rotating knob 12. Turning the knob 12 in an opposite direction causes convergence of these arms.

Figure 5:
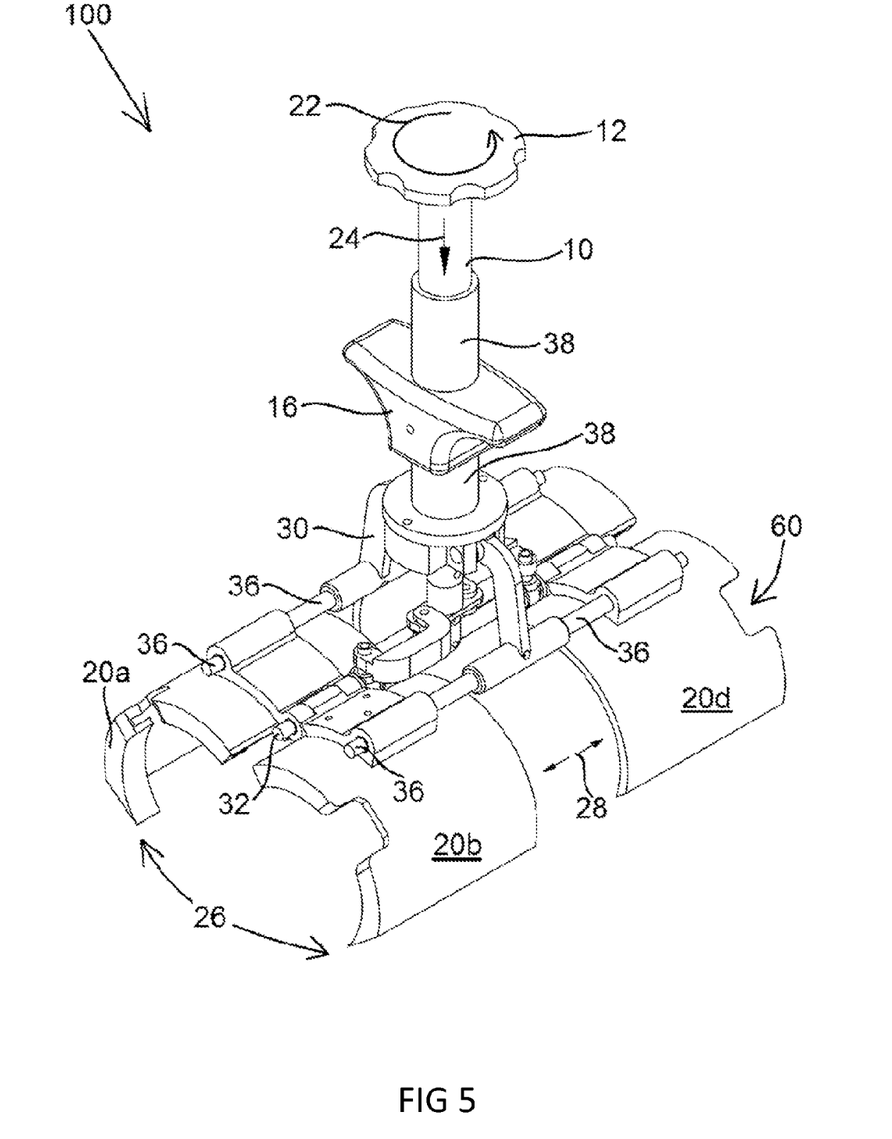
FIG. 5 is a perspective view schematically illustrating the dog feces collecting device 100 of FIG. 1 in a situation wherein the arms are maximally opened.

FIG. 5 is a perspective view schematically illustrating the dog feces collecting device 100 of FIG. 1 in a situation wherein the arms are maximally opened. FIG. 6 is a front view of the device in this situation, and FIG. 7 is a side view of the device in this situation.

Pushing (24) of lever 10 causes rotating (26) the arms around axle 32, while rotating (22) knob 12 causes the arms to linearly move away (28) from each other.

Reference numeral 30 denotes a transmission lever. The transmission lever 30 is pivotally connected by axle 34 to base 38, and also is pivotally connected by axle 36 to a point of an arm 20, wherein the point is distant to axle 32. Pushing lever 10 downwards (24) with regard to handle 16 is identical to pulling handle 16 upwards with regard to lever 10. Due to this mechanical structure, movement 24 (downwards) causes a pivotal opening movement (26) of a pair of arms (20a, 20b; and 20c, 20d). An inverse movement of lever 10 results in a pivotal closing movement of these arms.

The mechanism that causes a linear movement of the arms is illustrated and described below in FIGS. 10 to 12, and the description thereof.

The description so far has explained the change in the situation of the arms caused by pushing lever 10 and rotating knob 12. The next drawings describe using device 100 for collecting dog feces. But, before continuing with the description of operating the device for collecting dog feces, the structure of the collection container will be explained.

FIG. 8 schematically illustrates the bottom side of the dog feces collecting device 100 of FIG. 1.

In order to mount a container 40 into device 100, the following operations should be carried out:

Firstly, the arms 20a . . . 20d should be moved away from each other linearly and rotationally, to the situation illustrated in this figure. In order to carry out this step, the following stages are necessary:

Pair of arms 20a and 20b should linearly be moved away from pair of arms 20c and 20d. This is carried out by rotating knob 12.

When pair of arms 20a and 20b is distant from the pair of arms 20c and 20d, pressing lever 10 towards handle 16 results in rotating the arms along axle 32, i.e., each pair of arms 20a, 20b and 20c, 20d opens, as illustrated in this figure (actually the lower edge of arm 20a separates from the lower edge of arm 20b, and the lower edge of arm 20c separates from the lower edge of arm 20d). In this situation, the feces container 40 is placed between the arms 20a . . . 20d of device 100.

When leaving the lever 10 (or pulling lever 10 upwards), a spring (not illustrated) returns the arms to their idle state (illustrated in FIG. 1), resulting in grasping the container. In this situation, knob 12 is rotated in the reverse direction, resulting in linearly approaching pair 20a, 20b of arms to pair 20c, 20d of arms, thereby interlacing flaps 46 of the container in the folded edges 14 of the arms.

Thus, in this situation the arms are closed (as illustrated in FIG. 1), and the container 40 is grasped by the arms.

FIG. 9 schematically illustrates the mechanism of rotationally opening the arms of device 100 of FIG. 1, while container 40 is installed therein.

Arms 20*a* is pivotally connected to arm 20*b* (by axle 32), and arm 20*c* is pivotally connected to arm 20*d* (by the same axle). Pressing lever 10 downwards (24) results in pivotally opening each pair of the arms (20*a* from 20*b*; 20*c* from 20*d*). Pulling lever 10 upwards (or releasing a spring that generates the same operation) results in closing the arms.

As arms (actually by the folded edges 14 of the arms) grab container 40, pivotally opening the arms causes pivotally opening the container, and vice versa. Thus, in order to collect dog feces, the user pivotally opens the arms as illustrated in FIG. 9, places the open arms around the feces, and closes the arms. In order to dispose of the feces, he goes to a disposal facility (such as garbage can, drain hole, and so on), and pivotally opens the arms again, allowing the feces to fall from the container.

When he ends his walk, he can dispose of the entire collecting container 40 by pivotally and linearly opening the arms. If the container remains interlaced into the arms, he can use an elongated object such as screwdriver through a depression 60 in the arms to push the container out of the arms.

The device may be used either with a container that employs caps or with a container that does not employ caps.

Figure 10:
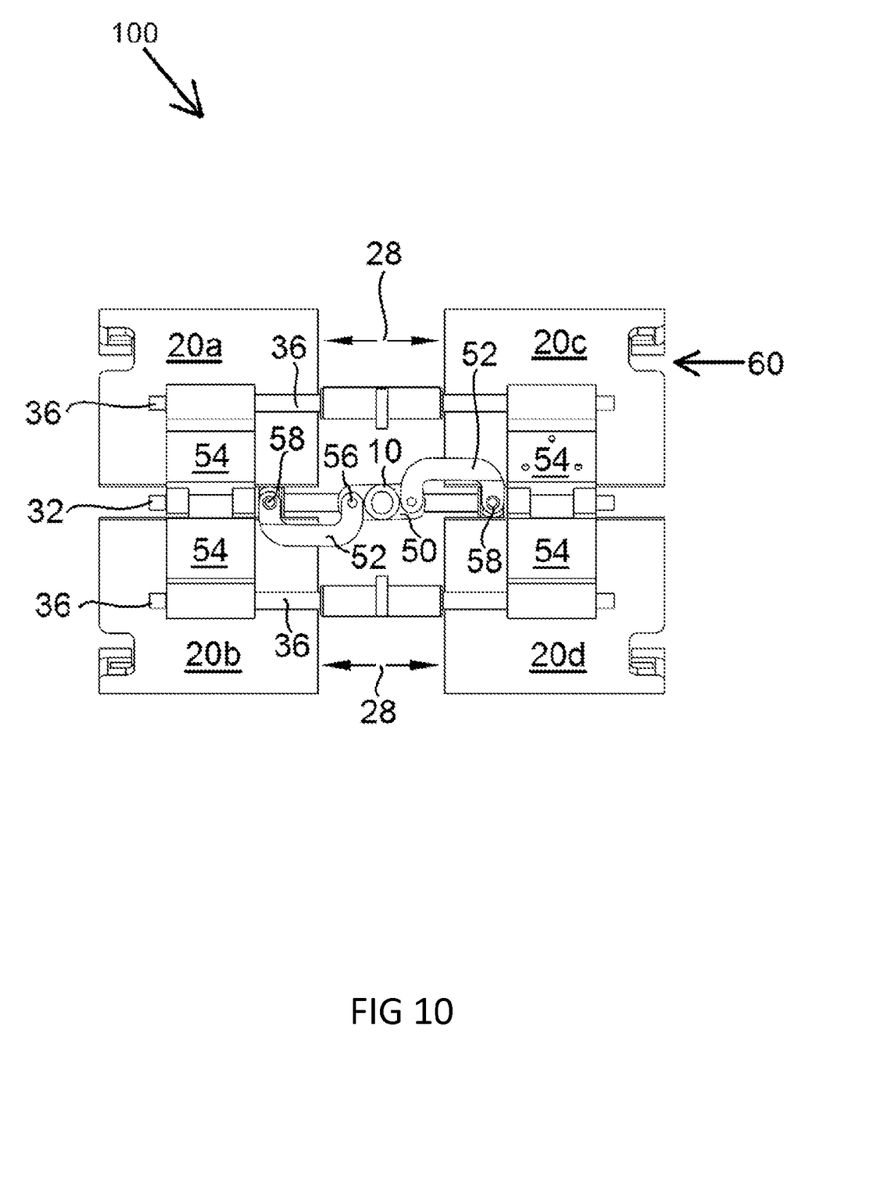
FIG. 10 is a top view of device 100 of FIG. 1.

FIG. 10 is a top view of device 100 of FIG. 1.

Figure 11:
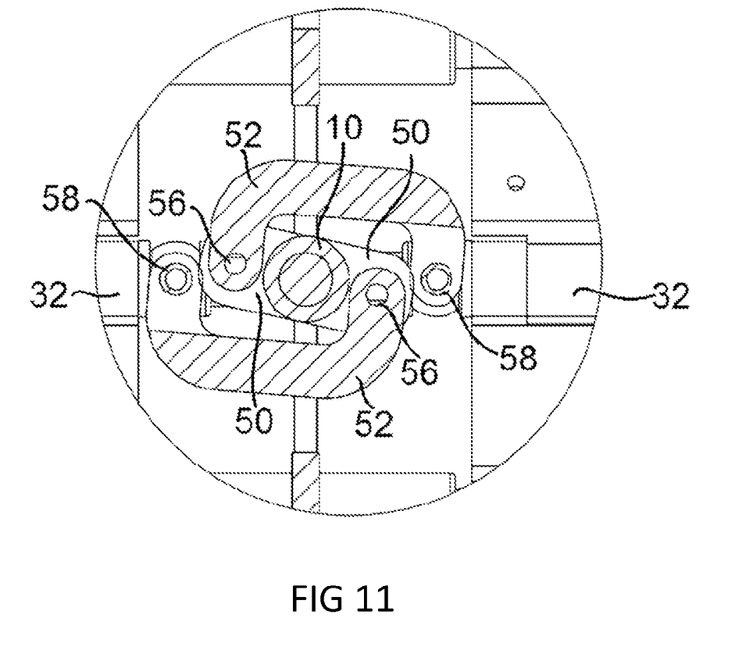
FIG. 11 is a zoomed sectional view thereof.

FIG. 11 is a zoomed sectional view thereof.

Figure 12:
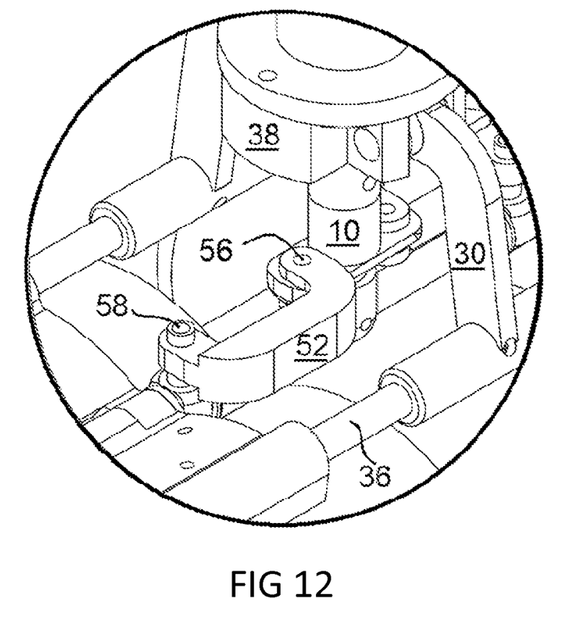
FIG. 12 is a perspective zoom thereof.

FIG. 12 is a perspective zoom thereof.

In these figures, in order to facilitate the explanation, knob 12 is not shown. However, it should be clear that as knob 12 is firmly connected to lever 10, rotating knob 12 results in rotating lever 10.

In these figures there is illustrated a crankshaft 50, firmly connected to lever 10. Thus, rotating lever 10 results in rotating crankshaft 50.

Crankshaft 50 is pivotally connected to a pair of arms. More specifically, crankshaft 50 is pivotally connected to a crank 52, which is pivotally connected to a pad 54, which is pivotally connected to a pair of arms.

As a result, rotating crankshaft 50 in one direction results in moving one pair of arms (20*a*, 20*b*) from the other pair of arms (20*c*, 20*d*); and rotating crankshaft 50 in the other direction results in approaching these pairs of arms to each other.

The Collecting Container

Figure 13A:
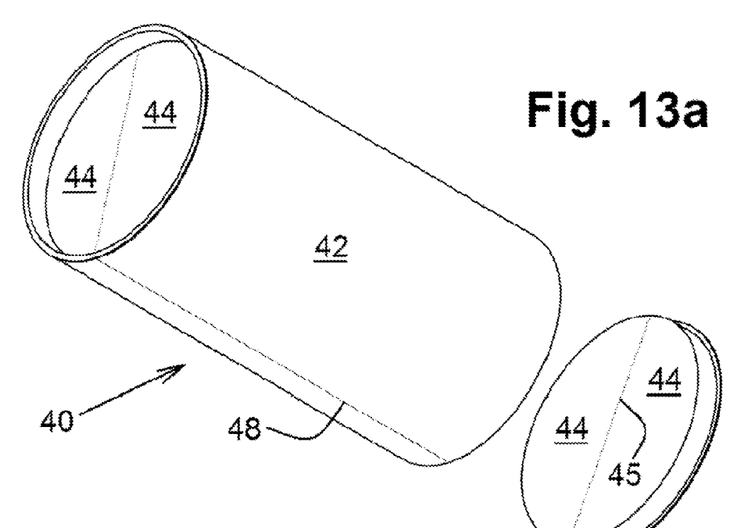
FIG. 13a pictorially illustrates a collecting container according to one embodiment of the invention.
Figure 13B:
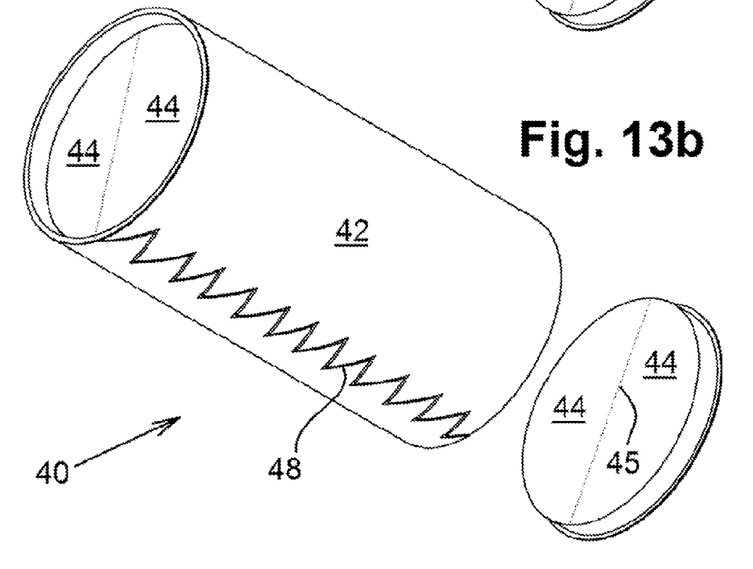
FIG. 13b pictorially illustrates a collecting container according to another embodiment of the invention.

FIG. 13*a* pictorially illustrates a collecting container according to one embodiment of the invention, and FIG. 13*b* pictorially illustrates a collecting container according to another embodiment of the invention. The collecting container is marked herein by reference numeral 40, and is shown also in FIGS. 8 and 9.

It has a cylindrical form, correspondingly with the crescent form of the arms 20*a* . . . 20*d*. The cylindrical walls of container 40 are marked herein by reference numeral 42.

Container 40 has marginal side walls 44 (also referred to herein as "caps"). A cap comprises a flap 46 connected to side wall 44. A cap may be designed as a single casted object.

The cylindrical wall 42 has a longitudinal cut 48, and flap 46 also has a longitudinal cut 45, correspondingly with cut 48. When container 40 is installed into the dog feces device 100, the flaps are interlaced into the folded edges 14 of the crescent arms. As a result, when the arms open, as illustrated in FIG. 9, the cylindrical container opens as well.

The cylindrical walls and also the caps may be designed to have a perforation of other tearable means along lines 48 and 45. Thus, when the arms 20*a* . . . 20*d* open as illustrated in FIG. 9, walls 42 and the caps are torn along lines 45 and 48.

Preferably, container 40 is designed to be disposable, although it may also be designed for repeated use.

The dog feces collecting container 40 may be made of cardboard or plastic. Preferably, the walls 42 of container 40 are a kernel cardboard tube of a toilet roller. As the kernel cardboard tube of a toilet roller has no other use, it may be further used as walls 42 of the dog feces container 40. Container 40 may be made of or coated with liquid rejecting material, such as wax.

The caps may be made of plastic, cardboard, and so on, and also may be made of or coated with liquid rejecting material, such as wax.

In FIG. 13*a* cut 48 is linear, while in FIG. 13*b* cut 48 is in a zigzag form. The zigzag form allows using the device in case the collection has to be carried out from a lawn.

It should be noted that a collecting container 40 in the size of a cardboard kernel tube of a toilet roller is suitable for a dog weighing up to 15 Kg. However the device may be designed for bigger containers. Furthermore, even if using a same container of a cardboard kernel tube, the owner may collect the waste by two "sessions", wherein in each session he disposes the waste.

In the figures and/or description herein, the following reference numerals (Reference Signs List) have been mentioned:

numeral 10 denotes a lever;
numeral 12 denotes a knob firmly connected to lever 10;
numeral 14 denotes means for grasping the container 40 in the form of folded edges in each of arms 20*a* . . . 20*d*;
numeral 16 denotes a handle connected to base 38, and is used as a holding point against lever 10;
numeral 18 is a cover of device 100;
each of numerals 20*a* . . . 20*d* denotes a crescent arm;
numeral 22 denotes a rotational movement of knob 12;
numeral 24 denotes a linear movement of lever 10;
numeral 26 denotes a pivotal motion of the arms (shown in FIGS. 5 and 6);
numeral 28 denotes a linear motion of the arms (shown in FIGS. 4 and 5);
numeral 30 denotes a transmission lever;
numeral 32 denotes an axle used for pivotally connecting a pair of adjacent arms (20*a*, 20*b* and 20*c*, 20*d*), and for horizontally allowing a pair of arms to be moved away and approached to the other pair;
numeral 34 denotes an axle that pivotally connects transmission lever 30 to base 38;
numeral 36 denotes an axle that pivotally connects transmission lever 30 to an arm (20*a* . . . 20*d*);
numeral 38 denotes a base (chassis) of device 100;
numeral 40 denotes a cylindrical dog feces collecting container;
numeral 42 denotes the walls of cylindrical container 40;
numeral 44 denotes the sidewalls of container 40;
numeral 45 denotes a cut or separatable lane (tearable perforation and the like) along flap 46, correspondingly to cut 48;
numeral 46 denotes a flap of sidewalls 44 of container 40;
numeral 48 denotes a longitudinal cut or separatable lane (tearable perforation and the like) along the cylindrical walls 42 of container 40;
numeral 50 denotes a crankshaft;
numeral 52 denotes a crank;

numeral 54 denotes a pad used for pivotally connecting crank 52 to a pair of scoop arms (20a, 20b and 20c, 20d);

numeral 56 denotes an axle that pivotally connects crankshaft 50 to crank 52;

numeral 58 denotes an axle that pivotally connects crank 52 to a pair of scoop arms (20a, 20b and 20c, 20d); and numeral 60 denotes a depression in an edge of a crescent arm (20a . . . 20d), through which container 40 can be pushed out of the arms of device 100.

In the description herein, the following references have been mentioned:

CITATION LIST

U.S. Pat. No. 5,355,836, U.S. Pat. No. 5,236,237, US20040119304, U.S. Pat. No. 8,177,270, EP2727464, US20130327283, U.S. Pat. No. 7,854,455, U.S. Pat. No. 8,534,725, US20080048463, US20100072765.

The foregoing description and illustrations of the embodiments of the invention has been presented for the purposes of illustration. It is not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

The invention claimed is:

1. A dog feces collecting device comprising:
   four crescent arms arranged in a line of two pairs defining a cylindrical space in the middle of said line, in which a cylindrical feces collecting container is placed;
   a longitudinal axle configured to pivotally connect each of said pair of arms from a top side thereof, thereby allowing:
      (a) rotationally drawing away the arms of each of said pairs from each other, and vice versa;
      (b) linearly drawing away each of said pair of arms from each other, and vice versa;
   a mechanism configured to perform the rotational movement;
   a mechanism configured to perform the linear movement;
   a mechanism in said arms configured to grasp said container;
   wherein said cylindrical container has a longitudinal cut or separatable lane;
   thereby allowing opening and closing said container while grasping thereof by said crescent arms, and allowing collection and disposal of dog feces by opening and closing said arms in a rotational movement, and disposal of dog feces.

2. A device according to claim 1, wherein said mechanism configured to perform the rotational movement is propelled by moving a lever.

3. A device according to claim 2, wherein said mechanism configured to perform the linear movement is propelled by rotating a knob firmly connected to said lever.

4. A device according to claim 2, wherein said mechanism, configured to perform the linear movement, includes:
   a crankshaft mechanically connected to said lever, and further configured so that a rotational movement of said lever along a longitudinal axis thereof results in rotating said crankshaft;
   two cranks, each crank connecting said crankshaft to one of the pair of arms;
   and configured so that pivotal rotation of said lever in one direction results in drawing each of the pair of arms from each other, and vice versa.

5. A device according to claim 1, wherein said mechanism configured to perform the rotational movement includes:
   a base having a vertical longitudinal cylindrical channel;
   a lever configured to be moved through said cylindrical channel, said lever connected to said axle;
   a transmission lever, pivotally connected at one end thereof to said base and pivotally connected to another end thereof to said crescent arms at a distance from said longitudinal axle;
   and further configured so that movement of said lever downwards results in opening each of side pair of arms wide in a rotational movement, and vice versa.

6. A device according to claim 1, wherein said container further includes a cap on each side thereof.

7. A device according to claim 6, wherein said cap includes:
   sidewalls;
   a flap; and
   a cut or separatable lane along said flap.

8. A device according to claim 1, wherein the mechanism configured to grasp said container is folded edges of said crescent arms.

9. A device according to claim 1, wherein at least one of said arms further includes a recess, configured to allow removal of said container from said device.

10. A device according to claim 1, wherein said container includes:
    cylindrical walls;
    a cut or separatable lane along said cylindrical walls.

11. A device according to claim 10, further including:
    sidewalls configured to cover openings of said cylindrical walls;
    a flap configured to connect said sidewalls to said cylindrical walls; and
    a cut or separatable lane along said sidewalls, corresponding to said longitudinal cut.

12. A device according to claim 10, wherein said cylindrical walls are a cardboard kernel tube of a toilet roller.

13. A device according to claim 10, wherein said cut or separatable lane is configured linearly.

14. A device according to claim 10, wherein said cut or separatable lane has a zigzag form.

15. A device according to claim 10, wherein said container is made of or coated with wax or other liquid-rejecting material.

* * * * *